United States Patent [19]

Watanabe et al.

[11] Patent Number: 5,076,336
[45] Date of Patent: Dec. 31, 1991

[54] PNEUMATIC TIRE WITH A REINFORCING LAYER FORMED BY SPIRALLY HOOPING TWO CONTINUOUS MATERIALS

[75] Inventors: Tadashi Watanabe; Seiichiro Nishide, both of Kodaira, Japan

[73] Assignee: Bridgestone Corporation, Tokyo, Japan

[21] Appl. No.: 361,348

[22] Filed: Jun. 5, 1989

Related U.S. Application Data

[63] Continuation of Ser. No. 89,821, Aug. 27, 1987, abandoned.

[51] Int. Cl.$^5$ .......................... B60C 9/20; B60C 9/26
[52] U.S. Cl. .................................. 152/533; 152/528; 152/531; 156/130
[58] Field of Search ............... 152/531, 533, 535, 538, 152/532, 526, 528; 156/117, 130

[56] References Cited

U.S. PATENT DOCUMENTS

| | | | |
|---|---|---|---|
| 3,850,219 | 11/1974 | Snyder | 152/531 |
| 4,146,415 | 3/1979 | Caretta et al. | 152/531 X |
| 4,183,389 | 1/1980 | Grosch | 152/531 X |

FOREIGN PATENT DOCUMENTS

| | | | |
|---|---|---|---|
| 51-55505 | 5/1976 | Japan . | |
| 55-08966 | 1/1980 | Japan . | |
| 56-71604 | 6/1981 | Japan | 152/531 |
| 58-206401 | 12/1983 | Japan | 152/531 |
| 60-213505 | 10/1985 | Japan . | |
| 52591 | 2/1967 | Luxembourg . | |
| 1487426 | 9/1977 | United Kingdom . | |
| 2015937 | 9/1979 | United Kingdom . | |
| 2061202 | 5/1981 | United Kingdom . | |
| 2070526 | 9/1981 | United Kingdom . | |

Primary Examiner—Michael W. Ball
Assistant Examiner—Gregory J. Wilber
Attorney, Agent, or Firm—Cushman, Darby & Cushman

[57] ABSTRACT

A pneumatic tire comprising a carcass made up of layers of cord materials and extending from one bead to the other bead, a tread portion disposed radially outwardly of the carcass and extending in a circumferential direction of the tire, a belt layer of at least one belt disposed between the carcass and the tread portion, and a reinforcing layer disposed between the tread portion and the belt layer, wherein the reinforcing layer is formed by spirally hooping two continuous ribbon materials, each of which is composed of two to twelve cord materials covered with rubber and has a ribbon width of 4-11 mm, on the belt layer in the circumferential direction so that the lateral edges of the belt layer are covered and that the ends of each ribbon material do not overlap each other, and wherein one of the ribbon materials is hooped in two or more layers at one laterally outer end portion of the belt layer and the other ribbon material is hooped in two or more layers at an opposite laterally outer end portion of the belt layer.

4 Claims, 5 Drawing Sheets

PNEUMATIC TIRE WITH A REINFORCING LAYER FORMED BY SPIRALLY HOOPING TWO CONTINUOUS MATERIALS

This is a continuation of application Ser. No. 07/089,821, filed Aug. 27, 1987, which was abandoned upon the filing hereof.

FIELD OF THE INVENTION

The present invention relates to a pneumatic tire and in particular to a radial pneumatic tire which is used at high speeds and which includes a belt reinforcing cap or layer between the tread portion and the belt portion.

DESCRIPTION OF THE PRIOR ART

Referring to FIGS. 9 and 10, there is shown a conventional radial pneumatic tire which is used at high speeds and which includes a belt reinforcing layer 1 consisting of two layers 1a and 1b each having a predetermined width $W_1$ and disposed radially outwardly of a lateral end portion 2a of a belt 2. Each reinforcing layer is composed of cords. The cords extend substantially in the circumferential direction of the tire and are covered with rubber. The lower reinforcing layer 1b is hooped around the belt 2, and then the longitudinal end portions $1b_1$ (FIG. 10) are overlapped with each other. Likewise, the upper reinforcing layer 1a is hooped on the lower reinforcing layer 1b previously hooped on the belt 2, and the longitudinal end portions $1a_1$ (FIG. 10) are overlapped with each other and vulcanized. Thus, the reinforcing layers 1a and 1b of the conventional tire form overlapped portions 4, respectively. In FIGS. 11 and 12 is shown another conventional radial pneumatic tire which is used at high speeds and which includes a belt reinforcing cap 7 of a predetermined width $W_7$ disposed radially outwardly of a belt 9 and covering a full width $W_9$ of the belt 9. The reinforcing cap 7 is composed of cords. The cords extend substantially in the circumferential direction of the tire and are covered with rubber. The reinforcing cap 7 is hooped around the belt 9, and then the longitudinal end portions 7a (FIG. 12) are overlapped with each other and vulcanized. Thus, the reinforcing cap 7 of the conventional tire also form an overlapped portion 11.

In both cases of the reinforcing layer 1 and the reinforcing cap 7, at least one overlapped portion 4 or 11 is formed on the circumference of the tire, and therefore the longitudinal end portions $1a_1$, $1b_1$ and 7a of the overlapped portions 4 and 11 slip each other and loosen, thereby weakening the tightening effect of the reinforcing layer and cap. Also, since the reinforcing lay 1 and the reinforcing cap 7 are increased in thickness due to the overlapped portions 4 and 11, thereby reducing an uniformity level of the tire and degrading a comfortable riding performance. Furthermore, in the lateral end portion 2a of the belt 2 shown in FIG. 9, the width of the upper reinforcing layer 1a can be reduced to a width $W_{1c}$ smaller than a full width $W_1$ of the lower reinforcing layer 1b in order that the belt 2 is tightened by the reinforcing layer 1, but if different layers of narrow and wide widths are used, two kinds of reinforcing layers different in width must be prepared. Furthermore, if the reinforcing cap 7 as shown in FIG. 11 is further used, the cap of the width $W_7$ must also be prepared in addition to the two kinds of layers. As a result, there is the disadvantage that various kinds of belt reinforcing layers and caps are required.

SUMMARY OF THE INVENTION

It is accordingly an important object of the present invention to provide an improved pneumatic tire which prevents and overcomes the aforementioned disadvantages attendant with the prior art.

In accordance with an important aspect of the present invention, there is provided a pneumatic tire comprising a carcass made upon of layers of cord materials and extending from one bead to the other bead, a tread portion disposed radially outwardly of the carcass and extending in a circumferential direction of the tire, a belt layer of at least one belt disposed between the carcass and the tread portion, and are in forcing layer disposed between the tread portion of the belt layer, wherein the reinforcing layer is formed by spirally hooping two continuous ribbon materials, each of which is composed of two to twelve cord materials covered with rubber and has a ribbon width of 4–11 mm, on the belt layer in the circumferential direction so that the lateral edges of the belt layer are covered and that the ends of each ribbon material do not overlap each other, and wherein one of the ribbon materials is hopped in two or more layers at one laterally outer end portion of the belt layer and the other ribbon material is hooped in two or more layers at an opposite laterally outer end portion of the belt layer.

BRIEF DESCRIPTION OF THE DRAWINGS

The drawbacks of a prior-art pneumatic tire and the features and advantages of a pneumatic tire according to the present invention will be more clearly understood from the following description taken in conjunction with the accompanying drawings in which.

DESCRIPTION OF THE PREFERRED EMBODIMENTS

Figure 1:
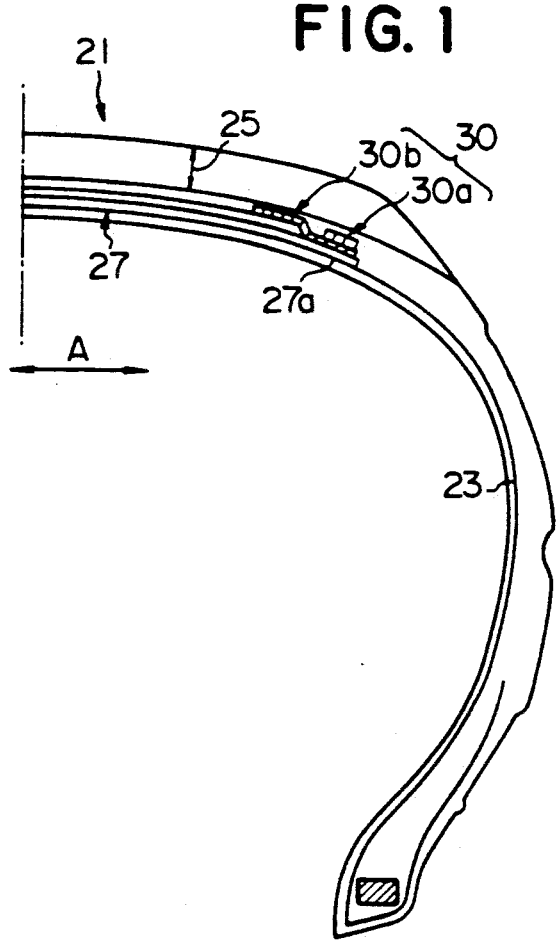
FIG. 1 is a part-sectional view of a first embodiment of the pneumatic tire in accordance with the present invention.
Figure 2:
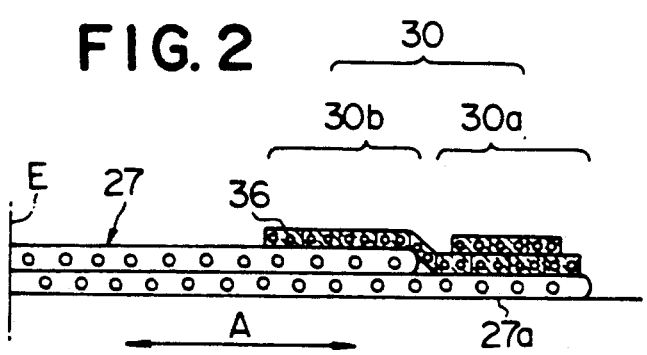
FIG. 2 is an enlarged sectional view of the ribbon-like material and the belt shown in FIG. 1.
Figure 3:
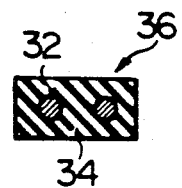
FIG. 3 is an enlarged sectional view showing cord materials of the ribbon-like material shown in FIG. 2.

Referring to FIG. 1 of the drawings, a radial pneumatic tire according to a first embodiment of the present invention is generally designated by reference numeral 21. The radial pneumatic tire 21 comprises a carcass 23 made up of layers of cord materials and extending from one bead to the other bead, a tread portion 25 disposed radially outwardly of the carcass 23 and extending in a circumferential direction of the tire, a belt 27 disposed between the carcass 23 and the tread portion 25, and a belt reinforcing layer 30 disposed between the tread portion 25 and the belt 27. The reinforcing layer 30 is formed by hooping a continuous ribbon-like material 36, which is composed of one to twelve cord materials 32 covered with rubber 34, on the belt 27 spirally in the circumferential direction of the tire. In this embodiment, the cord materials 32 of the ribbon-like material 36 comprises two nylon cords as shown in FIG. 3. When the ribbon-like material 36 of two cord materials 32 is used, there is the advantage that the number of hoops of the continuous ribbon-like material 36 can be reduced by half as compared with a ribbon-like material of one cord, thereby enhancing an efficiency of production. The continuous ribbon-like material 36 forming the belt reinforcing layer 30 is capable of being hooped with a variable hooping density in a lateral direction of the tire indicated by an arrow A in FIG. 2. More particularly, the reinforcing layer 30 of a laterally outer end portion 27a of the belt 27 comprises an outer reinforcing layer 30a and an inner reinforcing layer 30b, and in the outer reinforcing layer 30a, the ribbon-like material 36 is hooped in two layers, and in the inner reinforcing layer 30b, the ribbon-like material 36 is hooped in one layer. Thus, the hooping density of the hooped ribbon-like material 36 is reduced at the inner reinforcing layer 30b than at the outer reinforcing layer 30a.

The operation of the aforementioned first embodiment according to the present invention will be hereinafter described.

As mentioned above, the continuous ribbon-like material 36 forming the belt reinforcing layer 30 is capable of being spirally hooped with a variable hooping density in the lateral direction of the tire, and therefore, the hooping density can be increased gradually toward the outer end portion 27a of the belt 27 which should be more tightened, and decreased gradually toward a mid-circumferential portion E of the belt 27 which should be less tightened. Furthermore, the reinforcing layer 30 is formed by hooping spirally many times the continuous ribbon-like material 36 composed of one to twelve cord materials 32 covered with rubber 36, and therefore there is no overlapped longitudinal end portions which are formed in the aforementioned prior art. As a consequence, the belt reinforcing layer 30 according to the present invention is effectively prevented from slipping and loosening, thereby considerably enhancing the tightening effect of the belt and the tire durability performance at high speeds. In addition, since the continuous ribbon-like material 36 is hooped spirally, the leading and trailing end portions thereof are effectively prevented from being overlapped with each other, and therefore a uniformity level of the tire cannot be reduced and a comfortable riding performance of the tire cannot be degraded. Furthermore, since a narrow reinforcing layer and a wide reinforcing layer can be made by varying the hooping density of the continuous ribbon-like material 36, only one kind of a material is required to make the ribbon-like material 36, thereby considerably reducing the cost of production.

Figure 4:
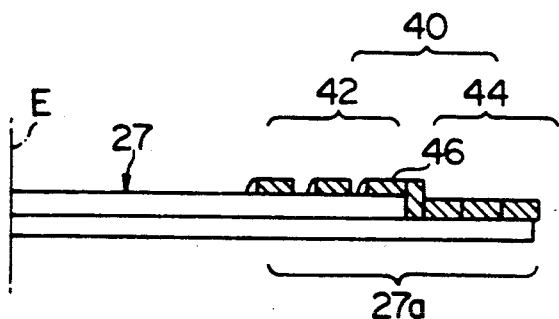
FIG. 4 is a part-sectional view showing a belt reinforcing layer of a ribbon-like material hooped on a belt in accordance with a second embodiment of the present invention.

Referring to FIG. 4, there is shown a belt reinforcing layer 40 of a ribbon-like material 46 spirally hooped on a belt 27 in accordance with a second embodiment of the present invention. The reinforcing layer 40 comprises a laterally inner reinforcing layer 42 which is spirally hooped on a laterally outer end portion 27a of the belt 27 with a predetermined spacing in the lateral direction of the tire, and a laterally outer reinforcing layer 44 which is hooped on the laterally outer end portion 27a of the belt 27 without the spacing. As a result, the hooping density of the continuous ribbon-like material 46 forming the reinforcing layer 40 is reduced from the outer reinforcing layer 44 toward the inner reinforcing layer 42. Other members are substantially identical in construction and operation to those of the first embodiment and therefore the description will be hereinafter omitted.

Figure 5:
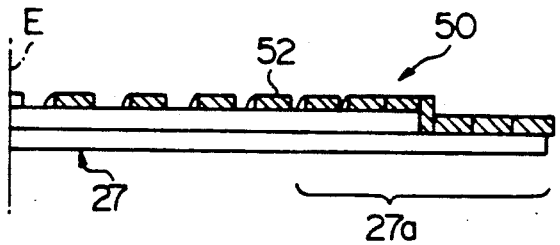
FIG. 5 is a part-sectional view showing a belt reinforcing layer of a ribbon-like material hooped on a belt in accordance with a third embodiment of the present invention.

Referring to FIG. 5, there is shown a third embodiment of the present invention. In this embodiment, a reinforcing layer 50 is used as a cap. That is, a continuous ribbon-like material 52 forming the reinforcing layer 50 is hooped over the full width of the belt 27 so that the spacing between the adjacent looped portions is gradually reduced from a mid-circumferential portion E of the tire toward opposite outer end portions 27a of the belt 27. More particularly, at the opposite outer end portions 27a, the ribbon-like material 52 is spirally hooped without the spacing between the adjacent looped portions thereof. When the reinforcing layer is one layer at the outer end portion of the belt as shown in FIGS. 4 and 5, it is desirable that the width of the ribbon-like material 52 be between 4 mm and 6 mm. If the width is less than 4 mm, the cost of production is increased, and if the width is more than 6 mm, the ribbon-like material of the reinforcing layer protrudes from the lateral end of the belt when it is hooped, so that cracks occur at the protruded portion. Other members are substantially identical in construction and operation to those of the second embodiment and therefore the description will be hereinafter omitted.

Figure 6:
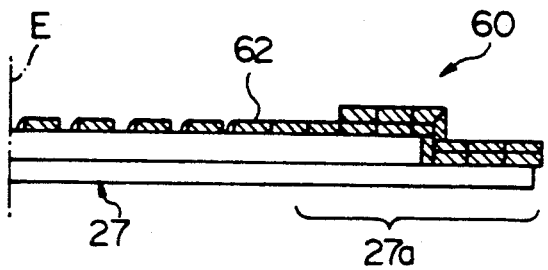
FIG. 6 is a part-sectional view showing a belt reinforcing layer of a ribbon-like material hooped on a belt according to a fourth embodiment of the present invention.

Referring to FIG. 6, there is shown a fourth embodiment of the present invention. A reinforcing layer 60 is provided over the full width of the belt 27. A continuous ribbon-like material 62 forming the reinforcing layer 60 is spirally hooped so that the spacing between the adjacent looped portions thereof is gradually reduced from a mid-circumferential portion E of the tire toward the opposite outer end portion 27a of the belt 27. At the outer end portion 27a, the ribbon-like material 62 is hooped in two layers without the spacing between the adjacent looped portions thereof. Thus, in this embodiment, the hooping density is increased at the opposite outer end portion 27a than the third embodiment shown in FIG. 5. When the reinforcing layer is hooped in two layers at the outer end portion of the belt as shown in FIG. 6, it is desirable that the width of the ribbon-like material be between 4 mm and 11 mm. If the width is less than 4 mm, the cost of production is increased, and if the width is more than 11 mm, the ribbon-like material of the reinforcing layer protrudes from the lateral end of the belt when it is hooped, so that cracks occur at the protruded portion. Other members are substantially identical in construction and operation to those of the third embodiment and therefore the description will be hereinafter omitted.

Figure 7:
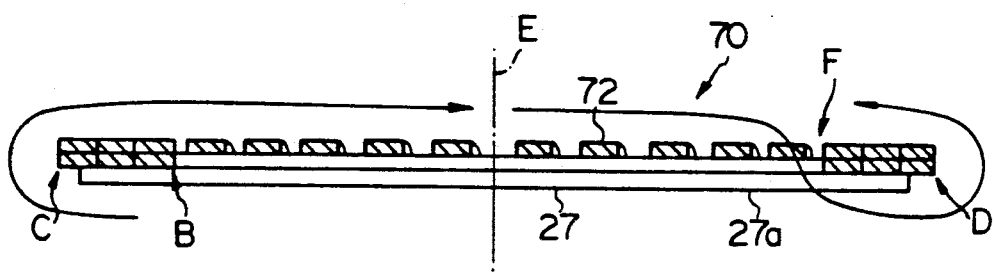
FIG. 7 is a view showing the manner in which a belt reinforcing layer of a ribbon-like material is hooped on a belt in accordance with a fifth embodiment of the present invention.

Referring to FIG. 7, there is shown the manner in which a belt reinforcing layer 70 of a ribbon-like material 72 is spirally hooped on the belt 27 in accordance with a fifth embodiment of the present invention. The ribbon-like material 72 is first hooped leftward of FIG. 7 from a position B to a lateral left end C. At the lateral end C, the hooping direction of the ribbon-like material 72 is turned to the position B so that the ribbon material can be hooped in two layers. The reinforcing layer 70 becomes one layer from the position B and the hooping density is gradually decreased toward the mid-circumferential position E. After passing the mid-circumferential position E, the ribbon-like material 72 is hooped so that the hooping density is gradually increased toward a lateral right end D. At the lateral right end D, the ribbon-like material 72 is again turned back to the mid-circumferential position E to be in two layers, and the hooping is completed at a position F. Thus, the ribbon-like material 72 is hooped with a locus of a generally inverted letter S indicated by the arrow in FIG. 7. As a result, the reinforcing layer 70 as shown in FIG. 7 can be easily formed continuously by a single ribbon-like material 72.

Figure 8:
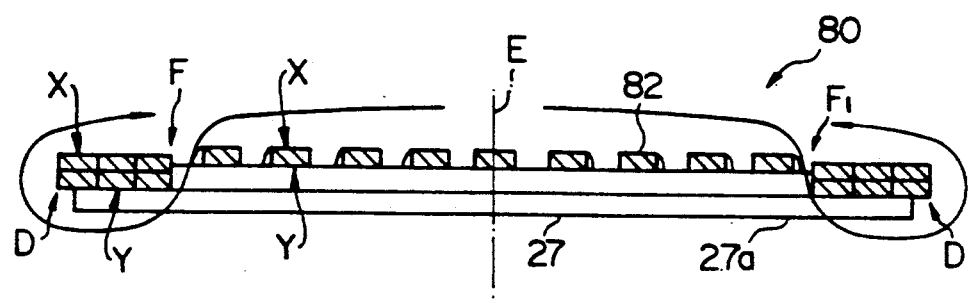
FIG. 8 is a view showing the manner in which two belt reinforcing layer of a ribbon-like material are hooped on a belt in accordance with a sixth embodiment of the present invention.
Figure 9:
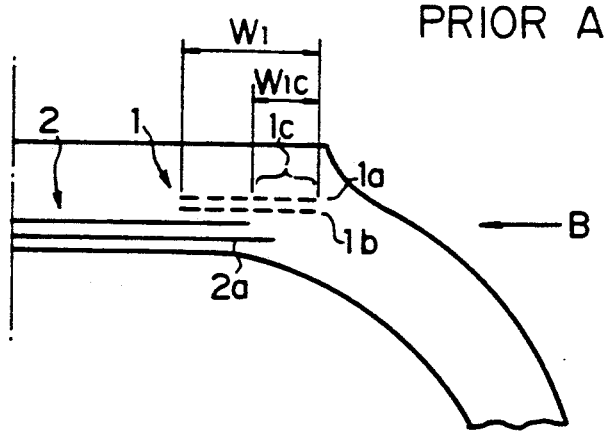
FIG. 9 is a part-sectional view showing a pneumatic tire of the prior art, two belt reinforcing layers being hooped on a laterally end portion of the belt.
Figure 10:
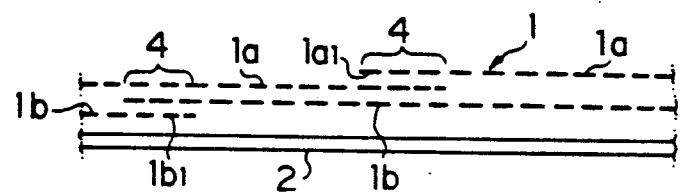
FIG. 10 is a side sectional view, taken from an arrow B of FIG. 9, showing that longitudinal end portions of the reinforcing layers are overlapped with each other.
Figure 11:
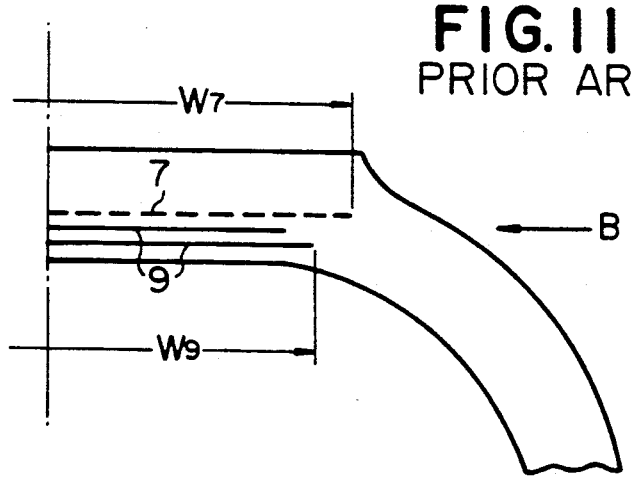
FIG. 11 is a part-sectional view showing a pneumatic tire of the prior art wherein the belt reinforcing cap is hooped over a full width of the belt.
Figure 12:
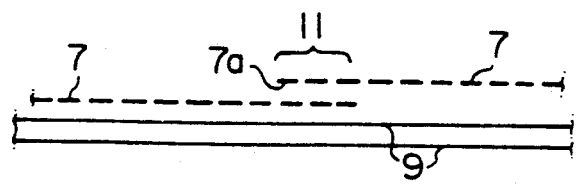
FIG. 12 is a side sectional view, taken from an arrow B of FIG. 11, showing that longitudinal end portions of the reinforcing cap are overlapped with each other.

Referring to FIG. 8, there is shown a sixth embodiment according to the present invention. The sixth embodiment is identical to the fifth embodiment of FIG. 7 except that two ribbon-like materials 82 forming a reinforcing layer 80 are used. The two ribbon-like materials 82 are hooped in opposite directions from the mid-circumferential position E to opposite ends D and D, and turned back at the ends D and D toward the mid-circumferential position E, and the hooping of the two ribbon-like materials 82 are completed at positions F and F. (Even though the hooping changes in direction of lateral offset from one hoop to the next at D at both lateral extremes of the layer 80 as the materials double back on themselves, the same faces X of the two ribbon-like materials remain facing radially outwards and the same faces Y remain facing radially inwards.) In this embodiment, two ribbon-like materials are used, but the reinforcing layer 80 can also be easily formed.

Figure 13:
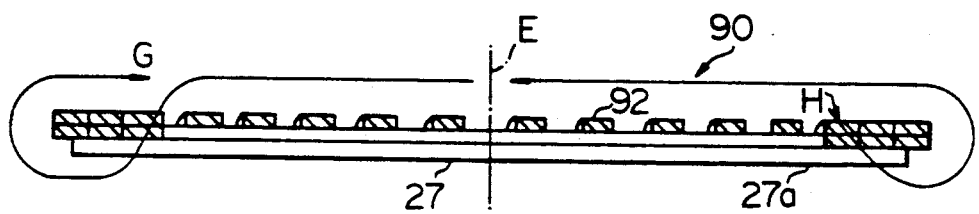
FIG. 13 is a view showing the manner in which a belt reinforcing layer of a ribbon-like material is hooped on a belt in accordance with a seventh embodiment of the present invention.

FIG. 13 shows the manner in which a belt reinforcing layer 90 of a ribbon-like material 92 is hooped on the belt 27 in accordance with a seventh embodiment of the present invention. The ribbon-like material 92 is first hooped laterally outward from a position H to the lateral edge of the belt 27, and turned back toward the mid-circumferential position E and turned back again at the other lateral edge of the belt 27 and terminated at a position G. It is noted that two ribbon-like materials 92 may be hooped from the positions H and E at the same time.

Figure 14:
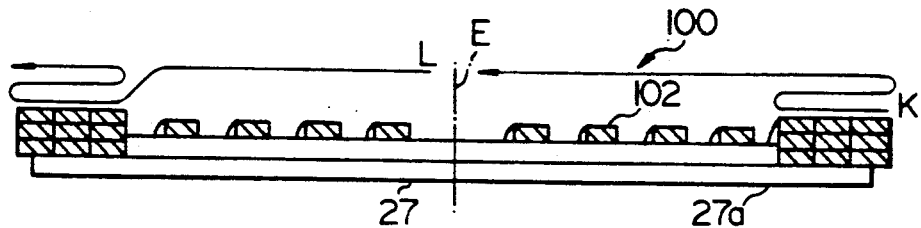
FIG. 14 is a view showing the manner in which a belt reinforcing layer of a ribbon-like material is hooped on a belt in accordance with an eighth embodiment of the present invention.

FIG. 14 shows the manner in which a belt reinforcing layer 100 of a ribbon-like material 102 is spirally hooped on the belt 27 in accordance with an eighth embodiment of the present invention. In this embodiment, the ribbon-like material 102 is hooped so as be three layers at the opposite outer end portions 27a of the belt 27. It is noted that two ribbon-like materials 102 may be hooped from positions K and L at the same time.

While certain representative embodiments and details have been shown for the purpose of illustrating the invention, it will be apparent to those skilled in this art that various changes and modifications may be made therein without departing from the spirit or scope of the invention.

What we claim is:

1. A pneumatic tire comprising
   a carcass made up of layers of cord materials and extending from one bead to the other bead,
   a tread portion disposed radially outwardly of the carcass and extending in a circumferential direction of said tire,
   a belt layer of at least one belt disposed between said carcass and said tread portion, and
   a reinforcing layer disposed between said tread portion and said one belt layer, wherein
   said reinforcing layer is formed by spirally hooping two continuous ribbon materials, each of which is composed of two to twelve cord materials covered with rubber and has a ribbon width of 4–11 mm, on said belt layer in said circumferential direction so that the lateral edges of said belt layer are covered and that the ends of each ribbon material do not overlap each other, and wherein one of said ribbon materials is hooped in two or more layers at one laterally outer end portion of said belt layer and the other ribbon material is hooped in two or more layers at an opposite laterally outer end portion of said belt layer.

2. A pneumatic tire as et forth in claim 1, wherein said continuous ribbon material is hooped with a variable hooping density in a lateral direction of said tire.

3. A pneumatic tire as set forth in claim 1, wherein said cord material of said continuous ribbon material is made of nylon.

4. A pneumatic tire as et forth in claim 1, wherein said continuous ribbon materials are hooped over the full width of said belt layer, so that he spacing between the adjacent hooped portions is gradually reduced from a mid-circumferential portion of the tire toward opposite outer end portions of said belt layer.

* * * * *